Dec. 19, 1967  L. L. HYLEN  3,359,438
COOLING AND SHAFT COUPLING ARRANGEMENT
Filed Oct. 1, 1965  4 Sheets-Sheet 1

WITNESSES:

INVENTOR
Lyle L. Hylen
BY
ATTORNEY

Dec. 19, 1967     L. L. HYLEN     3,359,438
COOLING AND SHAFT COUPLING ARRANGEMENT
Filed Oct. 1, 1965     4 Sheets-Sheet 2

Dec. 19, 1967     L. L. HYLEN     3,359,438
COOLING AND SHAFT COUPLING ARRANGEMENT
Filed Oct. 1, 1965     4 Sheets-Sheet 3

Dec. 19, 1967     L. L. HYLEN     3,359,438
COOLING AND SHAFT COUPLING ARRANGEMENT
Filed Oct. 1, 1965     4 Sheets-Sheet 4

# United States Patent Office 3,359,438
Patented Dec. 19, 1967

3,359,438
COOLING AND SHAFT COUPLING
ARRANGEMENT
Lyle L. Hylen, Pittsburgh, Pa., assignor to Westinghouse
Electric Corporation, Pittsburgh, Pa., a corporation of
Pennsylvania
Filed Oct. 1, 1965, Ser. No. 492,084
12 Claims. (Cl. 310—68)

The present invention relates to brushless AC power generating systems, and more particularly to cooling and coupling arrangements for rotating rectifier exciters and associated main generators that form a part of such systems.

The structure and operation of a roating rectifier exciter are shown and described in the copending application of Dillon B. Hoover, Ser. No. 455,206, filed May 12, 1965, and assigned to the present assignee.

One of the primary objects of exciting a synchronous generator with a rotating rectifier is to provide efficiency and reliability for power generating systems through the concept of brushless operation. To this end, a pilot exciter and a regulator provide controlled field energization for a main exciter, and a rotating armature of the main exciter in turn produces an alternating voltage which is applied to a rotating rectifier physically disposed with the main exciter armature on a common shaft. The rectifier voltage is then applied to the main generator rotating field winding which is also disposed on the common shaft, and brushless delivery of generator excitation power (say up to 4,000 kilowatts or more) is thereby achieved. Efficiency and reliability are accomplished through the elimination of maintenance and replacement problems normally associated with brushes, commutators and collector rings.

Since the exciter and generator use a common shaft, and since the exciter rectified voltage must be applied to the generator field, an expedient means for mechanically and electrically coupling the exciter and generator together is needed. At present the exciter current is generally conducted over the mechanical coupling means joining the exciter and generator shafts by suitable means such as positive and negative leads physically secured to the coupling means. For example, the leads may be secured in a narrow channel provided along the periphery of the shaft coupling means. From the coupling means, such leads are then secured to studs extending into the generator shaft that electrically contact conductors disposed within the center of the generator shaft. Inside the generator and generator housing, the exciter current is again brought out of the shaft by suitable insulated stud means and applied to the generator field windings. The generator housing is usually sealed for purposes of containing a cooling fluid that is circulated therein by blower blades suitably mounted on the rotating shaft. Thus, with the present means for coupling the exciter and generator shafts, no unitary structure is provided for coupling and connecting mechanically and electrically the exciter and generator, and no means is provided for cooling the connecting leads and coupler that is needed with the use of high currents.

With present power ratings, the current carrying conductors usually dissipate heat through the shafts and insulating material surrounding the conductors. However, with the high currents contemplated for use in systems using rotating rectifiers, mere dissipation of the heat through the shaft and insulators is not sufficient. A more adequate way of cooling the conductor is needed. Along with the need for more adequate cooling, a means is needed for coupling the exciter and rotor shafts together to permit easy assembly and disassembly of the torque transmitting elements and current carrying elements at the same time. Any coupling means contemplated would also have to provide for proper cooling of the conductor and machine elements being coupled.

Thus, in accordance with the principles of the present invention, there is provided a unitary structure for mechanically and electrically coupling the rotating shafts of an exciter and generator together while simultaneously allowing for the passage of a cooling fluid through the coupling and the exciter-generator shafts. This is accomplished by using hollow shafts with hollow electrical conductors disposed in the center of the shafts and insulated therefrom, and a coupling means that secures and seals the hollow conductors and shafts in proper alignment allowing the cooling fluid to flow in both directions through the coupler and conductors. The cooling medium used to cool the conductors can be used to cool the generator and exciter since the hollow shafts and conductors can be made to extend into each unit respectively. Similarly, the cooling medium may feed into the exciter and generator from an external source or it may be self-contained within the system for continuous recirculation therein. Further, the main flow of cooling fluid need not be associated with the cooling flow in the current carrying conductors since the conductors are provided with a plurality of fluid channels, and neither the conductors nor the fluid channels need be restricted to the center line of the shafts.

With the present invention no leads are carried on the outside of the coupling; from the exciter to the generator, conductors remain within the rotating shaft thereby allowing for a single coupling means to handle electrical flow of current and fluid flow of the cooling medium while simultaneously permitting mechanical coupling of the shaft at the same point of electrical and fluid coupling.

It is therefore an object of the present invention to provide a novel coupling means for a rotating rectifier and generator that permits easy and simultaneous assembly and disassembly of the current conducting and torque transmitting elements.

Another object of the invention is to provide a unique coupling device between the shafts of two machines that allows simultaneous connection of torque transmitting means, electrical transmitting means and cooling fluid transmitting means.

Another object of the invention is to provide a novel shaft coupling means for a rotating rectifier and turbine generator with no external electrical connections in the shaft coupling area.

Yet another object of the invention is to provide a novel means for cooling high current carrying elements in a rotating rectifier and main generator assembly.

Still another object of the invention is to provide a novel shaft coupling means that allows for the transfer of cooling fluid to high current carrying elements in a rotating rectifier exciter and an associated generator while simultaneously providing cooling to conductors disposed in the shaft.

These and other objects of the invention will become more apparent upon consideration of the following detailed description along with the attached drawings, in which:

FIGURES 1 and 2 respectively show mechanical and electrical schematic diagrams of a brushless synchronous generating system in which a rotating rectifier exciter and turbine generator is employed;

Figure 1:
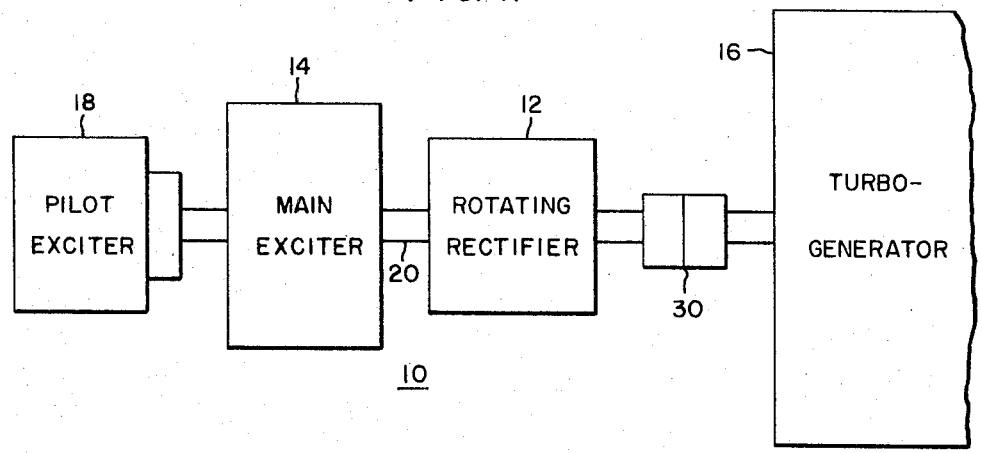

More specifically, to illustrate the principles of the invention, there is shown schematically in FIG. 1 an AC power generating system 10 in which is employed a rotating rectifier 12 and a main exciter 14 which provides field energization for main generator 16 through rotating rectifier 12. If desired, one or more fuse wheels (not shown) may be suitably disposed in system 10 and interconnected between main exciter 14 and rotating rectifier 12 for the purpose of diode circuit protection. Main exciter 14 receives its field energization from a pilot exciter 18. The pilot is stationary and receives its energy from a permanent magnet field located on and rotating with the exciter shaft. Preferably, a mechanically common shaft 20 is provided for power system 10, and when it is rotated by a suitable source of mechanical power, system 10 is electrically self-started and self-sustained by means of the pilot and main exciters 18 and 14 respectively.

Figure 2:
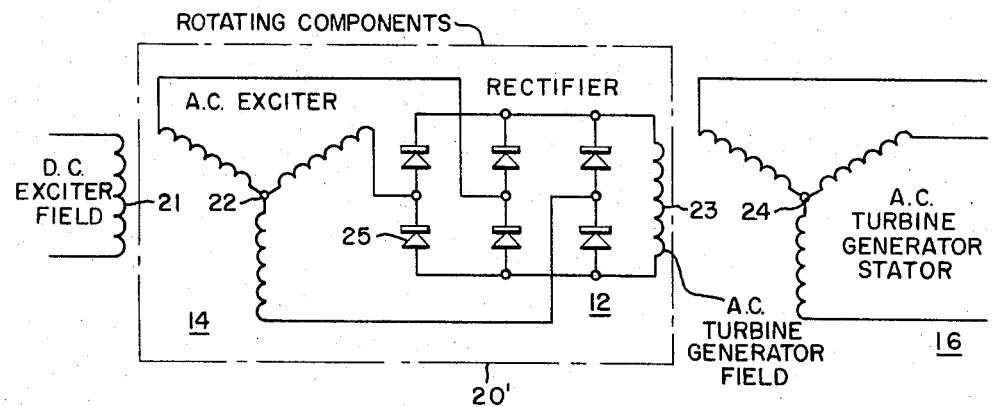

In the circuit of FIG. 2, the shaft 20 is shown in dot-dash outline 20′ so as to indicate clearly those components which undergo rotation. Main exciter 14 thus includes a rotating armature 22 which is electromagnetically related to a DC field 21, and in this instance, exciter armature 22 generates three-phase AC voltages in the three phase windings shown. Other winding arrangements can be used according to the voltage generating characteristics desired. The electrical output of armature 22 is applied to diodes 25 (only representatively shown) in rotating rectifier 12. Rectified (DC) voltage is thus applied to field windings 23 on the rotor of main generator 16. Generated power voltage then appears across stationary armature 24 of generator 16. Six diodes are shown for purposes of illustration. Obviously, any suitable number may be used.

In the machines presently used, the leads connecting diodes 25 to the main generator field 23 are brought across and secured to mechanical means coupling the rectifier and generator shafts together. The securing means must properly secure the leads against the centrifugal forces developed on the periphery of the rotating shafts and coupling means. And with the increased power ratings contemplated, the increase in the size and weight of the leads makes the centrifugal forces more of a problem as well as enhancing problems of space and heat dissipation.

In keeping with single shaft arrangements of rotating rectifier excited-generator systems, FIGS. 3 through 6 show a single, simple shaft coupling means 30 that allows ease of electrical and mechanical assembly while at the same time permitting a cooling fluid to flow through coupling means 30 to and from rotating rectifier 12 and generator 16. Coupling means 30 mechanically couples a rectifier exciter shaft 29 and a generator shaft 31, and electrically connects hollow axial exciter conductors 51 and 51′ to hollow, axial generator conductors 53 and 53′ supported in hollow centers of shafts 29 and 31 respectively and insulated therefrom by insulating sleeves 43.

Coupling means 30 includes coupling flange halves 39 and 40 which may form an integral part of shafts 29 and 31 respectively. The rectified output from rotating exciter 12 is applied to the centrally disposed conductor 51 through lead 49 and stud 50 (FIG. 3) secured in but insulated from shaft 29. Conductor 51 conducts the rectified current to coupling means 30 which further includes flexible electrical connector sections 52 which may take the form of a plurality of copper plates secured in a spaced apart relation by coupling bolts or other suitable means. Through connector sections 52, the rectified voltage is applied to field windings 23 of generator 16 via the axial conductor 53, a vertically disposed conductor 41 (with tapered portion threaded into conductor 53) and a flexible lead 56 connected to the rotor field windings, the end straps of which are designated by numerals 58 and 59 in FIG. 3. (The rotor field winding end turns are secured in rotor 33 by retaining ring 34.) The rectified current completes its path of travel through the rotating field via flexible lead 57 and radially extending conductor 42 which is secured in the body of rotor 33 and electrically connected to the axial conductor 53′.

The axial conductors 51 and 53 form the positive lead from rectifier 12 while the conductors 51′ and 53′ serve as the negative lead. Insulating means 70 separate the two conductors. To connect the negative half 51′ of the axial conductor to diodes 25, a lead and stud means (not shown) similar to that of 49 and 50 or other suitable means, may be used.

Figure 3:
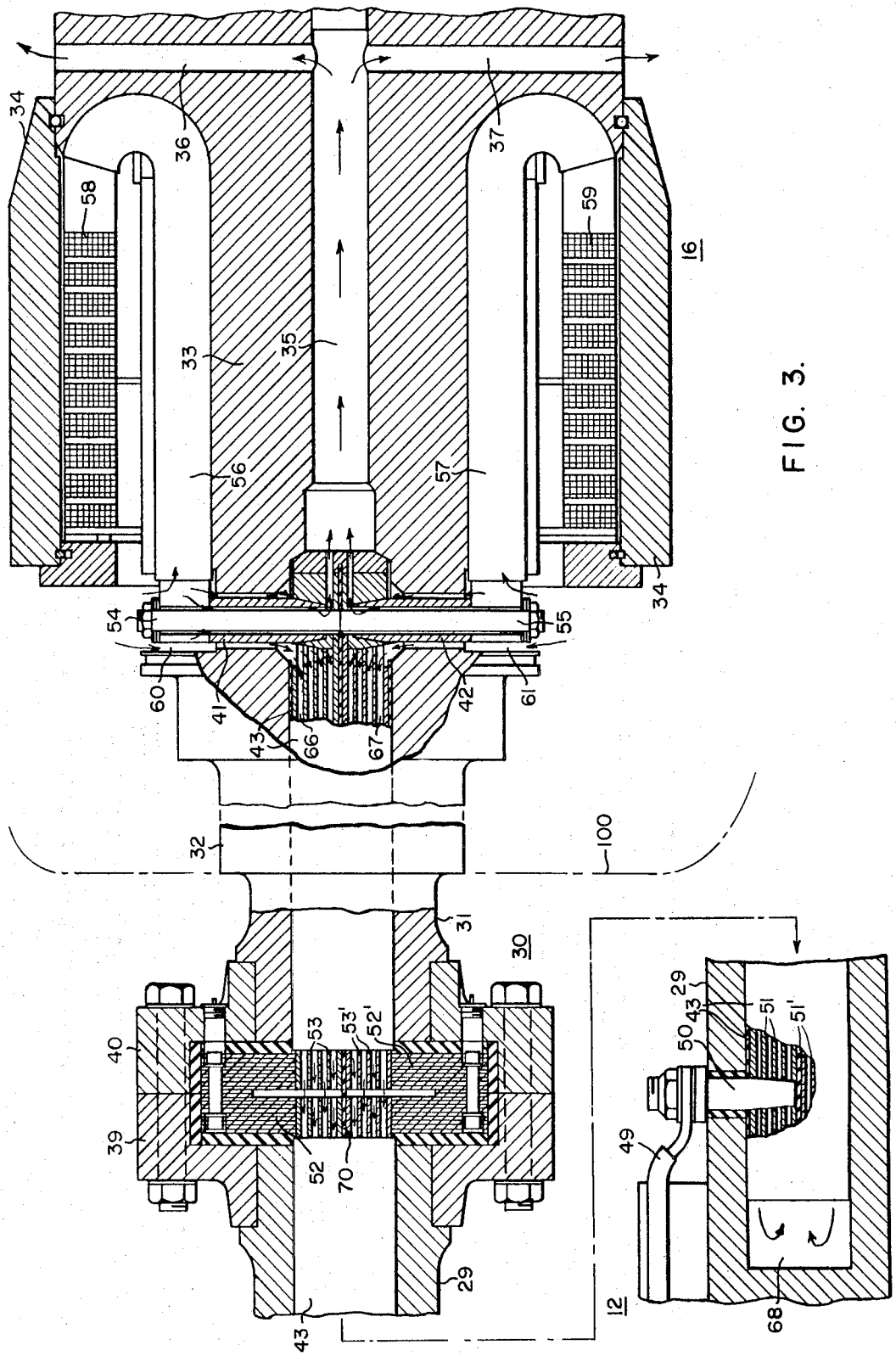
FIG. 3 is a fragmentary longitudinal view along portions of the rectifier and generator shafts including the coupling means constructed in accordance with the principles of the invention and shown partly in outline, partly in section and partly cut away.

In FIG. 3, dot-dash outline 100 denotes the generator housing. All those components disposed to the right of the housing outline are within the generator housing which is sealed to contain a cooling fluid, such as hydrogen gas, under pressure. The housing is sealed around shaft journal surface 32. The cooling system may be self-contained with the fluid circulated and recirculated in a closed system designed to include hollow conductors 51, 51′, 53 and 53′, as shown, or the system may include a means external of the machine (not shown) for circulating a fluid, such as water, from rotating rectifier 12 to generator 16 through the axial conductors. With the closed system, large blower blades (not shown) suitably mounted on rotor 33 in the generator move the cooling medium within housing 100, a portion of which is forced into the axial conductors around radially extending conductors 41 and 42. With a cooling medium supplied externally of the machines, external fluid connecting means may be provided in the rectifier end of hollow shaft 29. In either case, the cooling fluid in this invention is allowed to flow both ways through coupling connectors 52 and 52′, and the axial extending electrical conductors.

Figure 5:
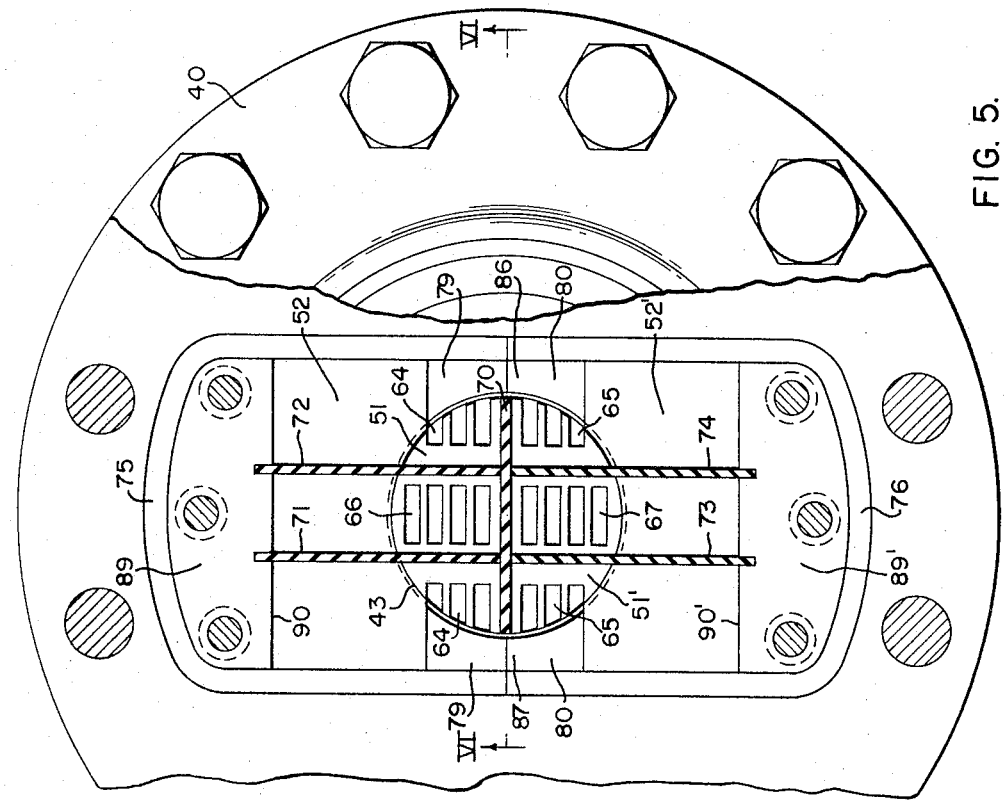
FIG. 5 shows the coupling means as viewed from reference plane V—V of FIGURE 4 shown partly in outline and partly in section.

In operation, the cooling fluid flowing within generator housing 100 enters radially extending openings or holes 60 and 61 located in rotor 33 and disposed around insulated stud means 54 and 55. Holes 60 and 61 open into conductor openings 66 and 67 which are centrally disposed in both of the axial conductors 53 and 53′. (For simplicity of illustration, numerals 66 and 67 will be used throughout the remainder of the specification to denote the inside passageways or channels for conveying the cool gas or liquid to the rotating rectifier. Similarly, numerals 64 and 65 will denote the outside passages for returning the gas to the generator as best seen in FIG. 5. These designations will hold consistent even though passages 64 to 67 actually become a part of different components along the path of fluid travel; the inside and outside passages are substantially identical in the axial conductors and in the connector sections.)

The cooling fluid passes through center openings 66 and 67 in the positive and negative conductors to the electrical connecting sections 52 and 52′. Sections 52 and 52′ have openings 66 and 67 substantially as those provided in positive and negative portions 53 and 53′ of the axial electrical conductors, thus allowing the coolant to pass on to the passages in conductors 51 and 51′. The coolant continues on and around stud 50 through both the positive and negative conductors and comes together in header portion 68 wherein the coolant is drawn into outside passages 64 and 65 in electrical conductors for its return to generator 16. The coolant returns through connector sections 52 and 52′ and electrical conductors 53 and 53′ into a bore 35 in the center of rotor shaft 33. From bore 35 the coolant flows out of the rotor through pole face holes 36 and 37. The coolant circulates within the generator thereby cooling the generator components. A portion of the coolant will again be drawn into radially extending holes 60 and 61 in rotor shaft 33 for travel through the hollow electrical conductors.

Figure 4:
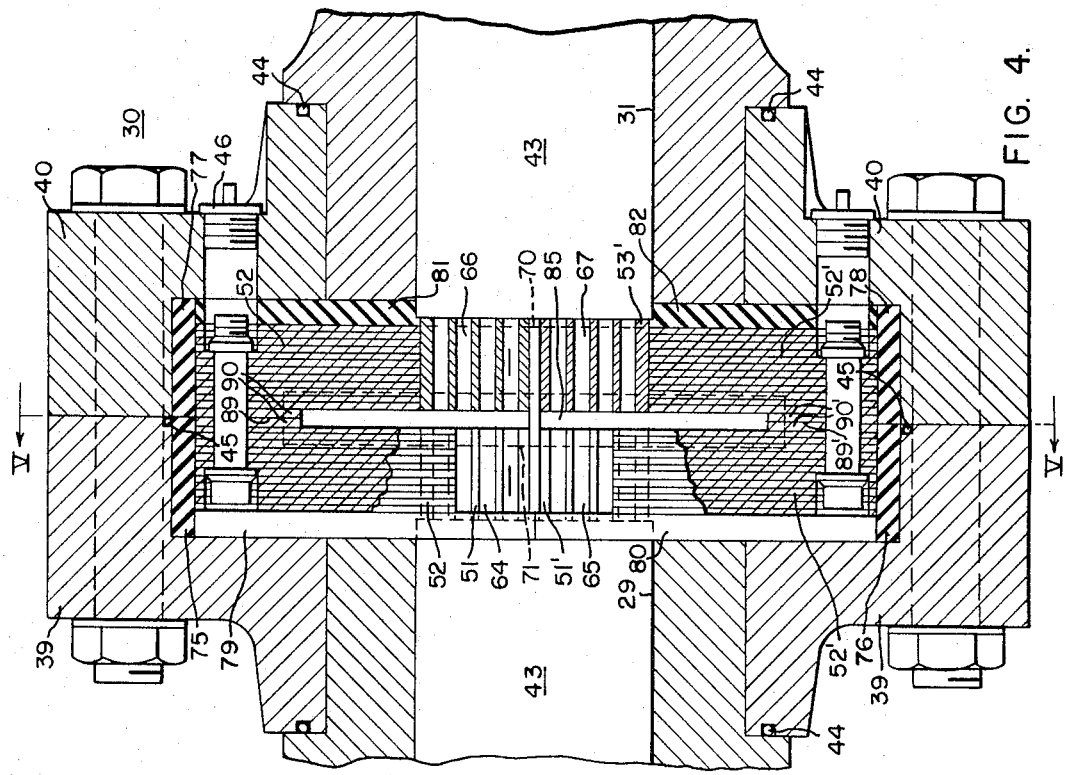
FIG. 4 is an enlarged view of the novel coupling means shown in FIGURE 3.

Coupling means 30 mechanically, electrically and hydraulically connects rotating rectifier 12 and generator 16. Flange halves 39 and 40 secure hollow rectifier shaft 29 to hollow generator shaft 31. As previously mentioned, flange halves 39 and 40 may form an integral part of shafts 29 and 31 or they may form separate parts as shown in the drawings. Where the flange means are separate from the shaft means, the two means can be aligned by a tapered key arrangement or other suitable means. Fluid tight seals 44 may be disposed between the flange edges engaging shaft section edges as shown in FIG. 4. Seals 44 may be O-rings or other suitable type seals. In FIG. 4, an O-ring seal 45 is also shown in the face of flange means 39. Thus, the outer physical structure of coupling 30 is sealed against fluid coolant leaks and held together by suitable means such as bolts as shown.

On the inside of coupling 30 the ends of the axial electrical conductors may be held in spaced apart relation by a set of spacers 71 and 72 in the top half (positive polarity) portion of the connector means, and by a similar set of spacers 73 and 74 in the bottom, negative polarity portion of the connector means as best shown in cross-section in FIG. 5. Flexible connector sections 52 and 52' and a space 85 provided between the ends of the axial conductors allow for the thermal expansion of the axial conductors into the coupling area with little stress being placed upon the axial conductors. The spacer sets 71 to 74 serve an additional function of separating the flow channels in the area 85 of the spaced apart electrical conductors. In the view presented in FIG. 5, the coolant flow from generator 16 will travel in inside passages or channels 66 and 67 out of the plane of the paper, whereas the return coolant to the generator will flow into the plane of the paper in outside channels 64 and 65. In other words, spacer set 71 and 72 maintains the integrity of the two channels in the top, positive polarity section in the spaced apart area 85 while spacer set 73 and 74 does the same in the bottom, negative polarity section of the connector.

Figure 6:
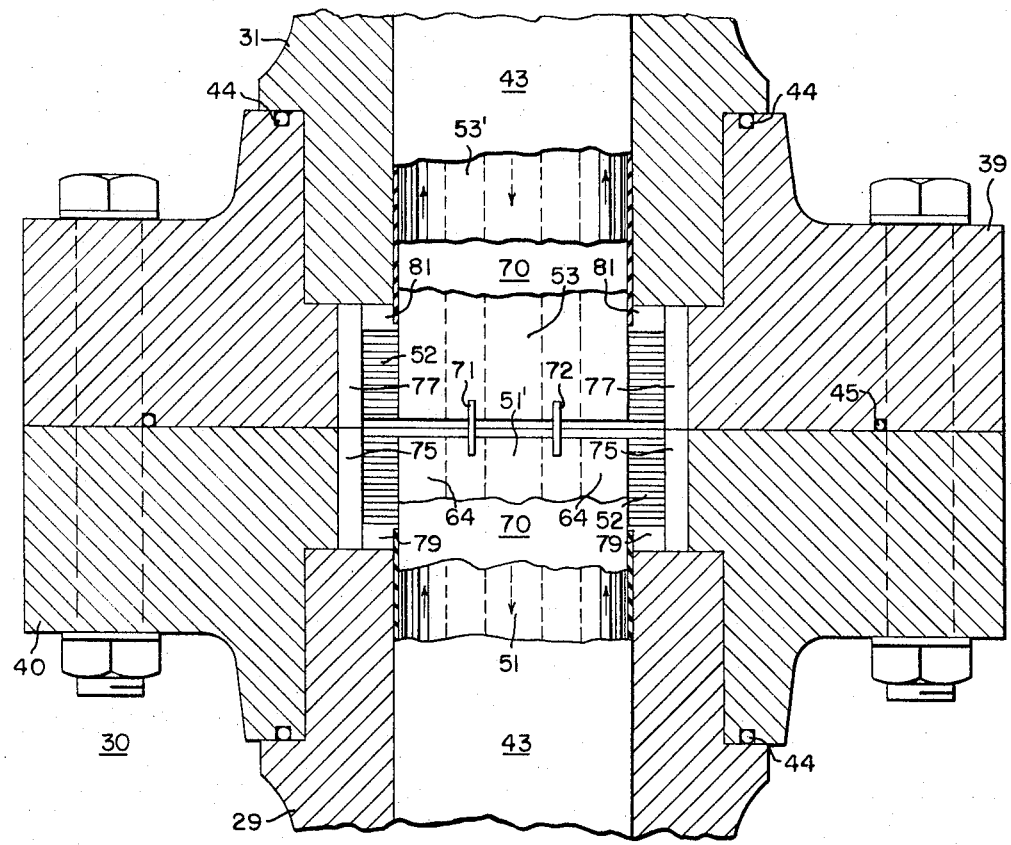
FIG. 6 is a view of the coupling means taken along reference plane VI—VI of FIGURE 5.

As best shown in FIG. 6, the spacer set (71 and 72 being shown in elevation) fit in grooved or slotted areas provided in the axial electrical conductors 51 and 53. Copper connecting sections 52 and 52' in the area of the blocking sets are easily appropriately cut or otherwise designed to fit snugly around the blocking sets.

In FIG. 4, two of the connecting sections 52 and 52' are shortened and designated 89 and 89' (with edges 90 and 90' shown in elevation in FIG. 5) to provide the thermal expansion space 85. Two sections (89 and 89') are shown only for purposes of illustration; obviously more or less sections may be used depending upon the amount of space desired between the ends of the axial electrical conductors.

Electrical connector sections 52 and 52', which may take the form of copper plates as mentioned earlier, rest on and are in electrical contact with hollow electrical conductors 51, 51', 53 and 53' adjacent the ends thereof extending into coupling 30. The edges of connector sections 52 and 52' may be secured to the electrical conductors by brazing or other suitable processes. In FIG. 4, sections 52 and 52' on the left of expansion space 85 are shown in elevation. The connector sections are cut or otherwise designed to fit the outside curvature of electrical conductors 51 and 51' as shown in elevation in FIGS. 4 and 5. In FIG. 4, on the right side of expansion space 85, electrical connectors 52 and 52' and axial conductors 53 and 53' are shown in cross-section so that inside coolant flow channels 66 and 67 are shown in elevation, whereas on the left side of expansion space 85 outside channels 64 and 65 are shown in elevation; insulating sleeves 43 are shown in elevation on both sides. As best shown in FIG. 5, connector sections 52 and 52' fit around the contour of the electrical conductors to the first edge of outside coolant passages 64 and 65 thereby forming space areas 86 and 87 between connector sections 52 and 52' and between peripheral insulating walls 75, 76 and the axial electrical conductors.

Insulating means enclose the connector sections on all sides thereby completely separating the shafts and flange halves from electrical contact with sections 52 and 52'. Insulating means 75, 76, 77 and 78 wrap around the edges of sections 52 and 52', insulating means 75 and 76 being shown in elevation in FIG. 5. Across the exposed sides of the connector sections, and between insulating means 75 through 78, extend insulating walls 79 through 82, walls 79 and 80 shown in elevation in FIG. 4 while walls 81 and 82 are shown in cross-section in FIG. 4. Walls 81 and 82 contain an aperture for inserting securing bolts and nuts and wrenches as best shown in FIG. 4. In FIG. 6 the bottom end of insulating means 75 and 77 are shown in elevation. In the corners formed by insulating means 75, 77 and the ends of exciter and generator shafts 29, 31 respectively (FIG. 6) lie insulating walls 79–82 in elevation but mostly obscured by the cut-away portions showing the axial conductors and insulating means 70 that separates the positive from the negative conductor. The ends of electrical connecting sections 52 are also shown in elevation in FIG. 6 with insulating means 75 and 77, and 79–82 maintaining sections 52 in the insulated center of shaft coupling means 30.

Connector sections 52 and 52', and shortened sections 89 and 89' can be physically held together by a bolt and nut means (as shown) or by any other suitable means extending through openings provided in the sections.

To assemble coupling 30, shafts 29 and 31 and the electrical conductors disposed therein are axially aligned. With cooling flow channels and blocking sets being properly aligned and fixed in place, coupling bolts can be inserted and coupling halves 39 and 40 bolted together. Conductor bolts can then be inserted through bolt holes in flanges 39, 40 and the conductor connector sections bolted together using a self-locking nut preassembled in one connector section. After the wrenches are removed, the wrench holes can be sealed off with sealing plug 46 as shown in FIG. 4. The means and method of securing the shafts and connector section together are given by way of example only. Novel coupling 30 may be assembled using other means and methods without departing from the spirit and scope of the invention.

From the foregoing description, it should now be apparent that a new coupling means has been disclosed that is particularly useful in synchronous machines of the type excited by rotating rectifier means. The novel coupling disclosed eliminates external connecting leads secured along shaft coupling means thereby eliminating the means necessary to secure heavy (high current carrying) leads against the centrifugal forces developed on the periphery of the shafts and coupling means. At the same time a relatively simple coupling means is provided that allows for a rotating rectifier exciter to be coupled to a main generator mechanically, electrically and hydraulically thereby making possible easy assembly and disassembly of the torque transmitting components and the current conducting elements while simultaneously permitting a cooling fluid to flow between the exciter and generator to cool the components and elements. All these advantages and others result from the novel structure disclosed.

Over the years, brushless exciter power ratings have soared. As mentioned earlier, heat dissipation through the shafts and insulators is not adequate to cool the high current carrying leads made necessary by the rapid increase in power ratings. The novel structures shown and described in this disclosure are particularly suitable in the new machines designed to meet the increase in power requirements. The invention disclosed provides an exciter-generator shaft assembly with a surety of operation and ease of maintenance heretofore unavailable.

Through the invention has been described with a certain degree of particularity, it is to be understood that this present disclosure has been made only by way of example and that numerous changes in details, combination and arrangement of parts may be accomplished without departing from the spirit and scope of the invention. For example, in the embodiment shown the cooling fluid cools the current carrying conductors passing through coupling 30. Obviously, the cooling fluid may be used to cool only generator and/or exciter components.

What is claimed is:

1. A coupling arrangement for at least two rotating machines, each having a shaft means extending therebetween with means for coupling adjacent ends of the shafts together, at least one hollow electrical conductor disposed in each of said shafts and insulated therefrom, means for connecting adjacent ends of the conductors together, said connecting means adapted to pass a fluid flowing in the hollow conductors.

2. A coupling arrangement for at least two rotating machines, each having a hollow shaft means extending therebetween with means for mechanically coupling adjacent ends of the shafts together, at least one electrical conductor disposed in said hollow shafts and insulated therefrom, said electrical conductor having a plurality of channels therein for conducting a fluid therethrough, means connecting adjacent ends of the conductor together in the shaft coupling means, said connecting means adapted to pass said fluid flowing in said conductor channels.

3. A coupling arrangement for at least two rotating machines, each having a hollow shaft means with adjacent ends of the shafts coupled together, means for passing a fluid through the shafts and coupled ends comprising at least one hollow electrical conductor disposed within each of said shafts and adapted to pass said fluid in both directions beween the machines, adjacent ends of said conductors having connector means electrically connected in a spaced apart relation for conducting electrical energy between the machines, said connector means being adapted to pass a fluid in both directions.

4. A coupling arrangement for at least two rotating machines, each having a shaft means extending between them with means for coupling adjacent shaft ends together, at least two hollow electrical conductors having a plurality of channels extending the length thereof disposed in each of said shafts and insulated therefrom, means for connecting adjacent ends of the conductors together, said connecting means adapted to pass a fluid flowing in the hollow conductors.

5. A coupling arrangement for a rotating rectifier and generator, each having shaft means extending therebetween with means for coupling adjacent ends of the shafts together, a hollow electrical conductor disposed in the center of each of said shafts and insulated therefrom, means for connecting the adjacent ends of the conductors together in the shaft coupling means, said connecting means adapted to pass a fluid flowing in the hollow conductors.

6. In a means for mechanically and electrically coupling a rotating rectifier exciter and generator rotor, an arrangement comprising hollow exciter and rotor shaft means, means for coupling adjacent ends of the shafts together between the exciter and rotor, a hollow electrical conductor disposed in the center of each of said shafts and insulated therefrom for electrically connecting the exciter to the rotor, means for electrically connecting adjacent ends of the conductors in spaced apart relation in the shaft coupling means but insulated therefrom, said connecting means adapted to pass a fluid flowing between the exciter and generator through the hollow conductors.

7. In a means for mechanically and electrically coupling a rotating rectifier exciter and generator rotor, an arrangement comprising hollow exciter and rotor shafts having flanged ends for securing the exciter and rotor shafts together, the flanged ends forming a cavity therebetween, a hollow electrical conductor disposed in the center in each of said shafts and insulated therefrom, means for electrically connecting adjacent ends of the conductor in spaced apart relation in the cavity formed by the flanged ends of the shafts, said connecting means designed to pass fluid flowing in the hollow conductors.

8. A cooling arrangement for a rotating rectifier and generator, each having a hollow shaft means with adjacent ends of the shafts coupled together between the rectifier and generator, means for passing cooling fluid through the shaft and the coupling ends comprising a hollow electrical conductor means disposed within the hollow shaft means and adapted to pass the cooling fluid in both directions between the rectifier and generator, adjacent ends of the conductor means having connector means electrically connected and secured together in a spaced apart relation for conducting electrical energy from the rectifier to the generator, said connector means being adapted to pass the cooling fluid in said both directions.

9. A cooling arrangement for a rotating rectifier and generator, each having a hollow shaft means extending therebetween with means for mechanically coupling adjacent ends of the shafts together, an electrical conductor disposed in the center of each of said hollow shafts and insulated therefrom, said electrical conductor having a plurality of channels therein for conducting a cooling fluid therethrough, means connecting adjacent ends of the conductors together in the shaft coupling means, said connecting means adapted to pass the cooling fluid flowing in the conductor channels.

10. A coupling arrangement for a rotating rectifier and generator, each having shaft means extending therebetween with means for coupling adjacent ends of the shafts together, at least two hollow electrical conductors disposed in each of the shafts and insulated therefrom, means for connecting adjacent ends of the conductors together in the shaft coupling means, said connecting means adapted to pass a fluid flowing in the hollow conductors.

11. A cooling and coupling arrangement for a rotating rectifier and generator, each having shaft means extending therebetween with means for coupling adjacent ends of the shafts together, at least two electrical conductors disposed near the axial center of each of said shafts and insulated therefrom, each of the conductors having a plurality of passageways extending the longitudinal length of the conductors, means for connecting adjacent ends of the conductors together with their passageways in axial alignment in said shaft coupling means, said connecting means being adapted to pass a fluid flowing in the hollow conductors.

12. A coupling arrangement for a rotating rectifier and generator, each having a shaft means extending therebetween with means for coupling adjacent ends of the shafts together, at least two electrical conductors disposed near the axial center of each of said shafts and insulated therefrom, each of said conductors having a plurality of passageways extending the length of the conductors, means for electrically connecting adjacent ends of the conductors in spaced relation in the shaft coupling means with said passageway in axial alignment, the integrity of the passageways being maintained at the spaced apart adjacent conductor ends by partitions disposed between the adjacent conductor ends.

References Cited
UNITED STATES PATENTS

| | | | |
|---|---|---|---|
| 3,145,314 | 8/1964 | Becker | 310—68 |
| 3,114,094 | 12/1963 | Lee | 310—68 |
| 3,075,104 | 1/1963 | Willyoung | 310—64 |
| 2,897,383 | 7/1959 | Barrows | 310—68 |
| 2,894,155 | 7/1959 | Labasite | 310—59 |

MILTON O. HIRSHFIELD, *Primary Examiner.*

J. D. MILLER, *Assistant Examiner.*